(12) United States Patent
Beale et al.

(10) Patent No.: X9670
(45) Date of Patent: May 23, 1836

(54) SLITTING TIMBER

(76) Inventors: Robert Beale; Moses Bucklin

United States Patent
Patent No.: X9670
Beal & Bucklin,
Edging Timber.
Patented May 23, 1833.
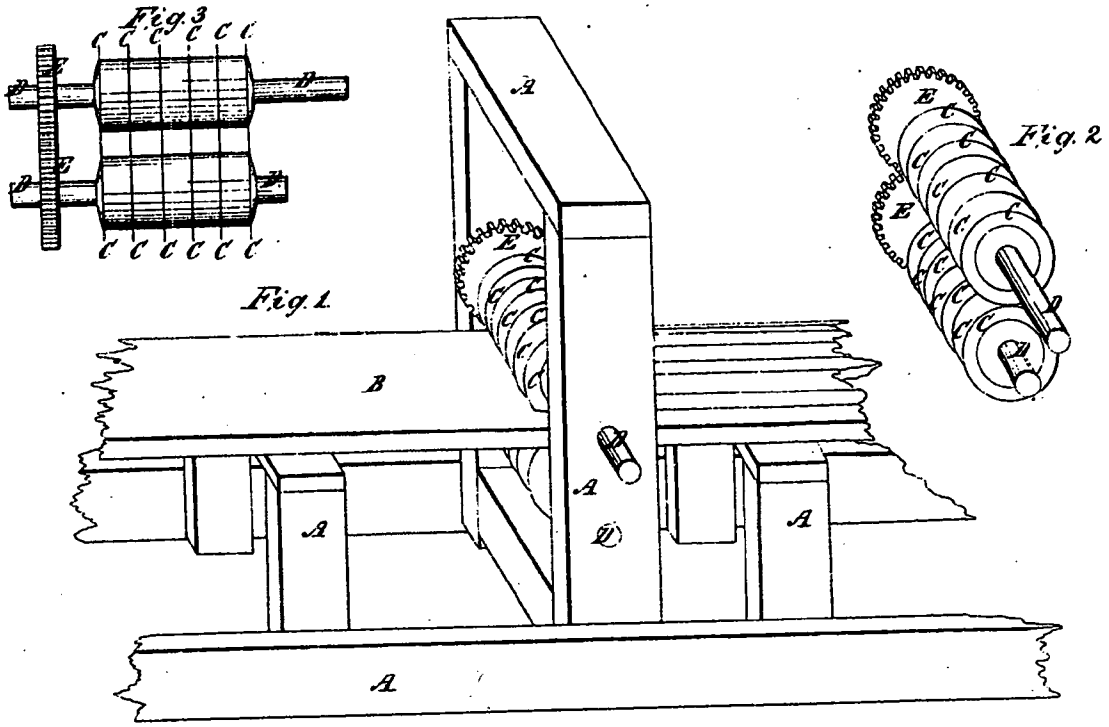
AM. PHOTO-LITHO. CO. N.Y. (OSBORNE'S PROCESS.)